Patented May 3, 1927.

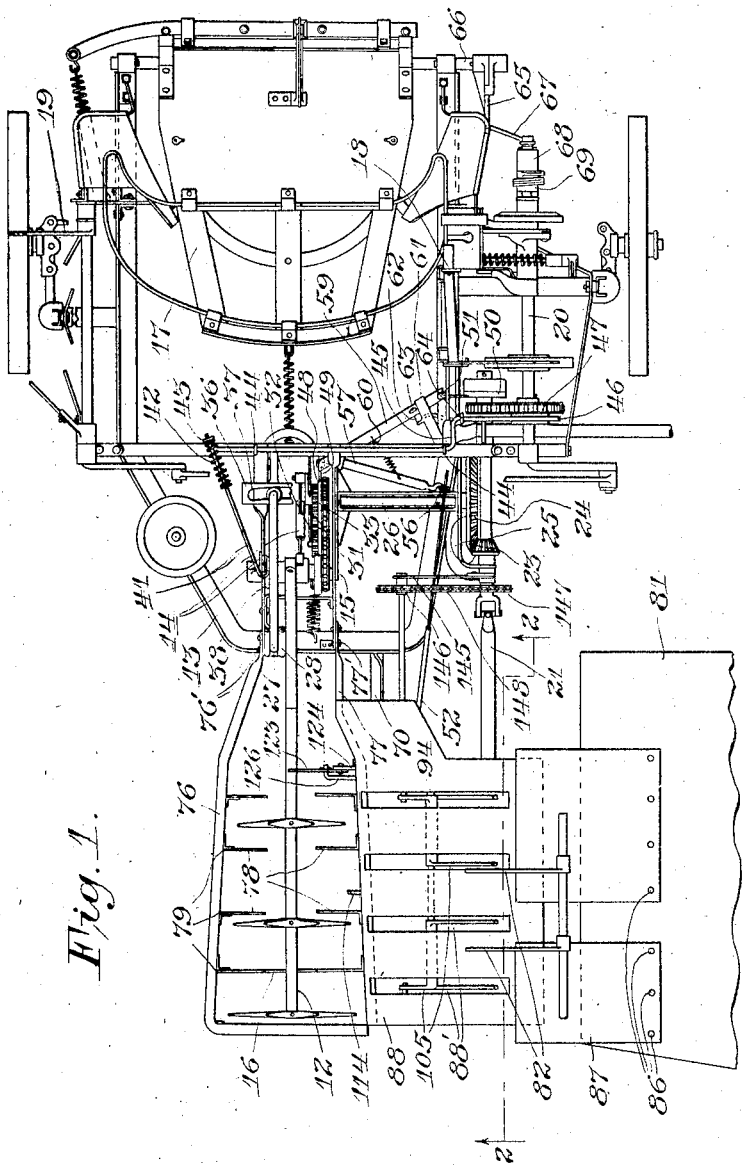

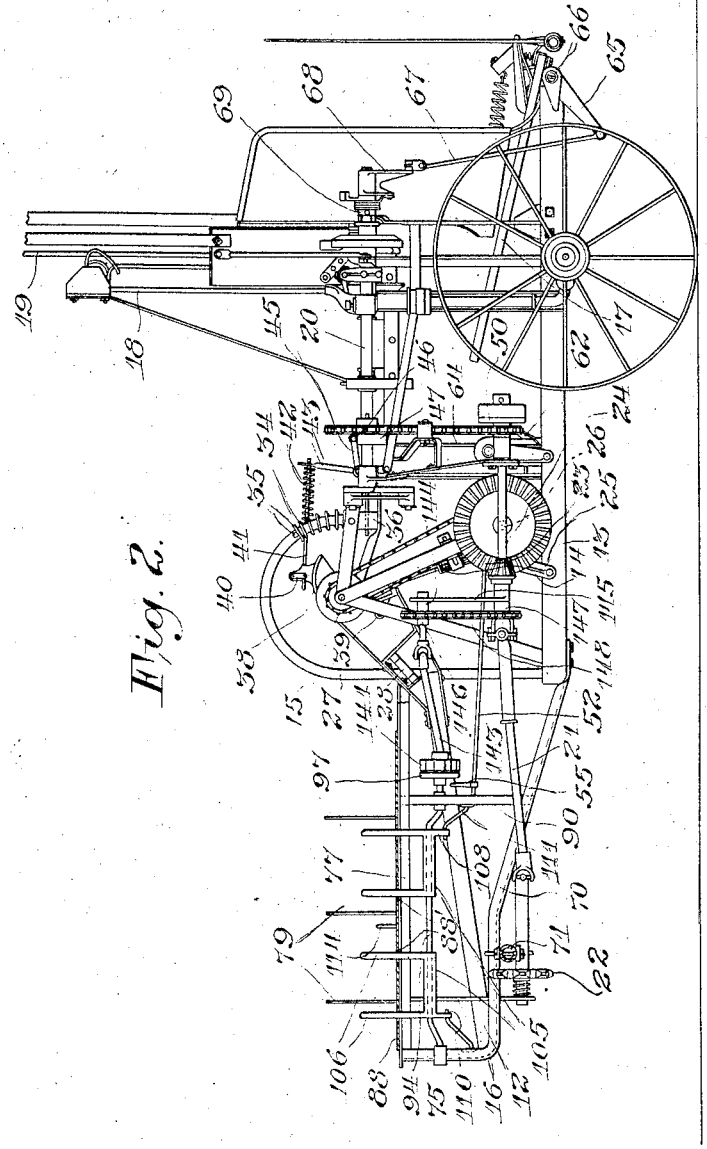

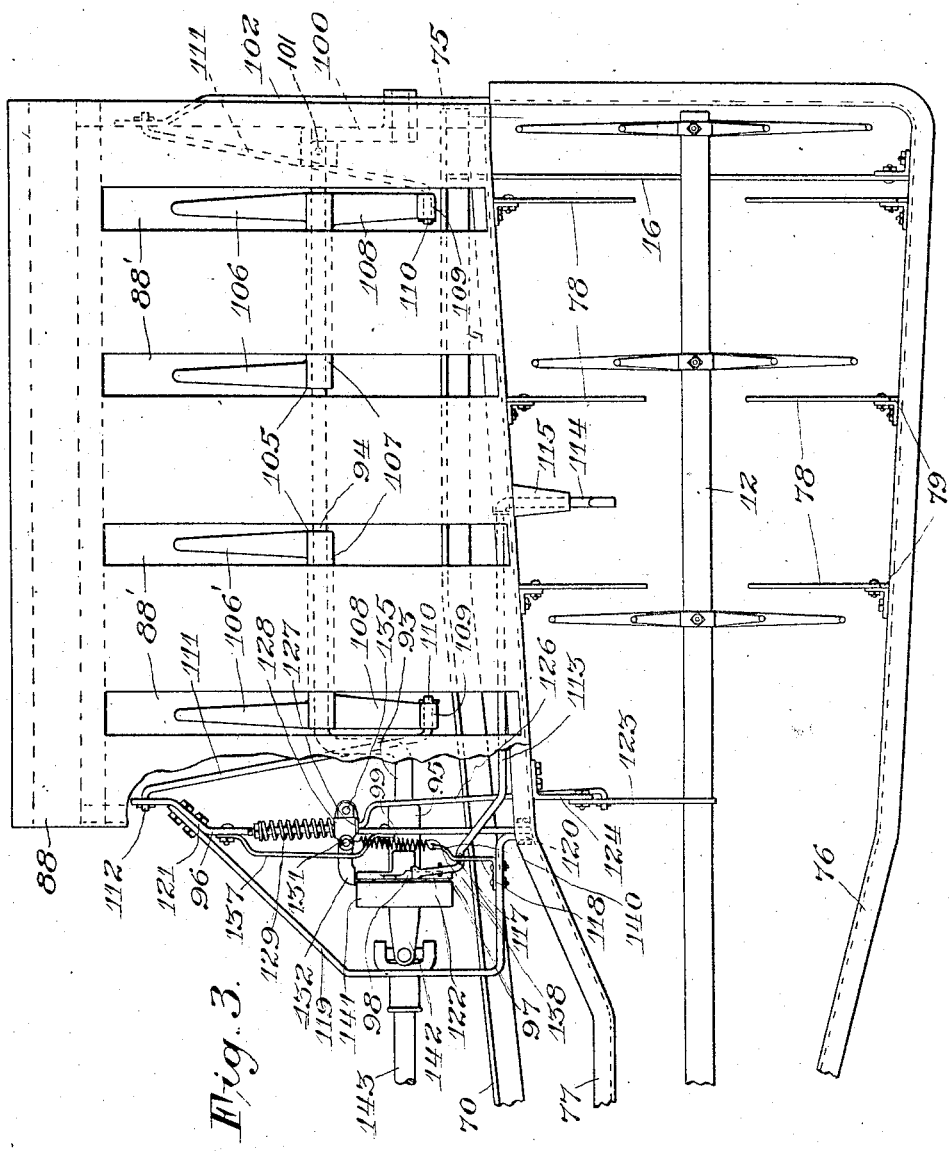

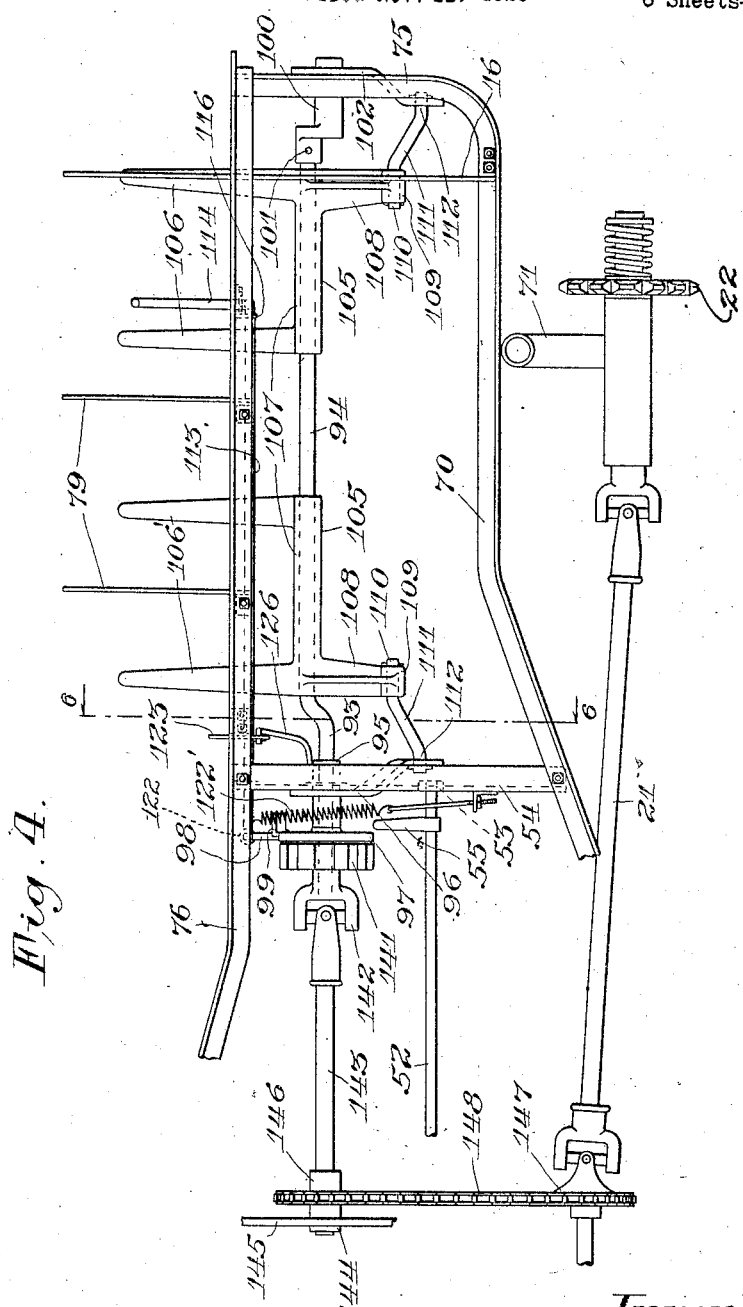

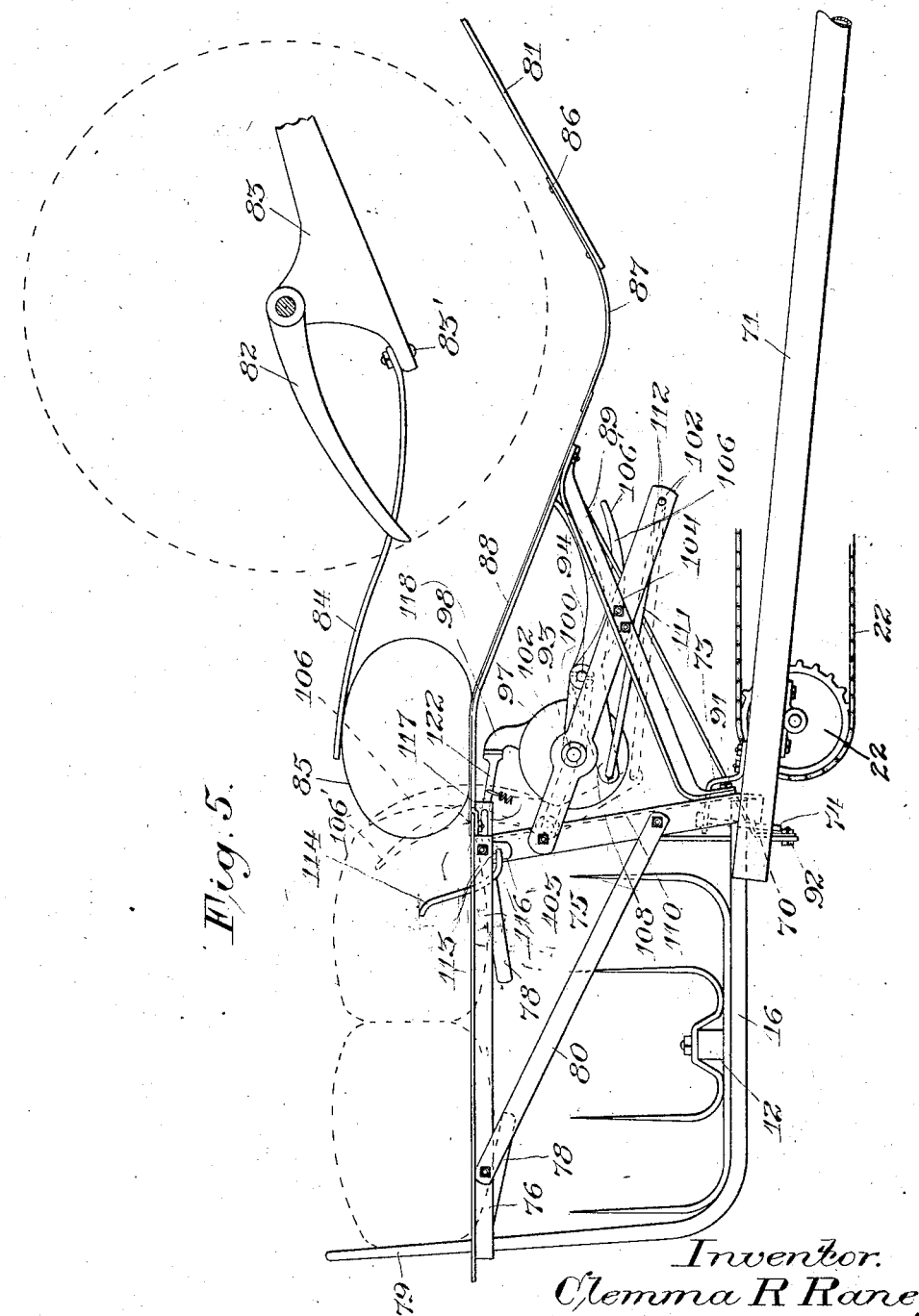

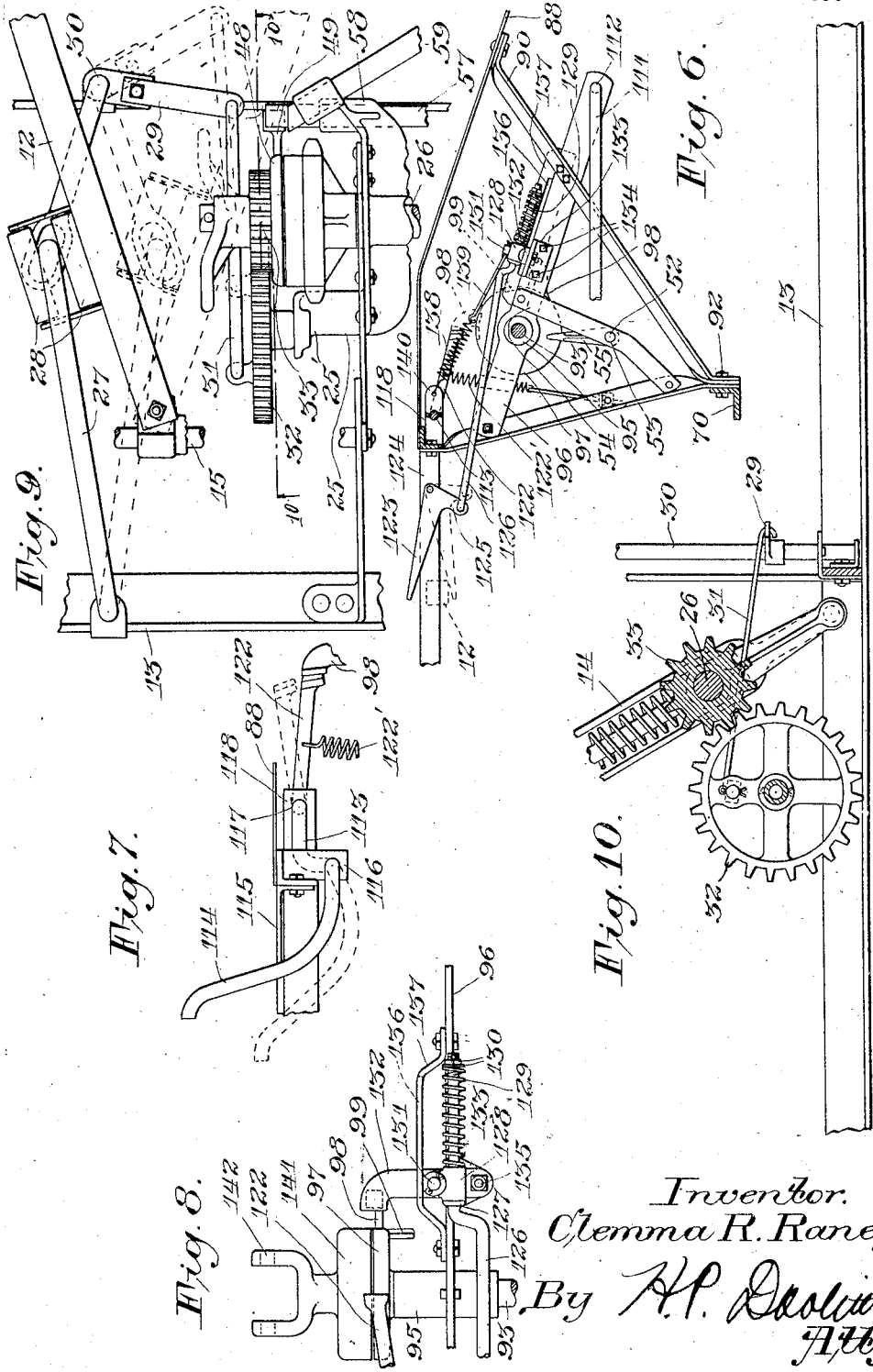

1,627,203

UNITED STATES PATENT OFFICE.

CLEMMA R. RANEY, OF CHICAGO, ILLINOIS, ASSIGNOR TO INTERNATIONAL HARVESTER COMPANY, A CORPORATION OF NEW JERSEY.

GRAIN SHOCKER.

Application filed November 11, 1920. Serial No. 423,226.

My invention relates to shocking machines, and has for its object to improve the construction and operation of a shocking machine in such a manner that the same will set stable shocks in the field and at the same time provide a simple and rugged construction which may be readily manufactured.

A further object is to produce a sheaf-discharging mechanism especially adapted to co-operate with a shocker and discharge the sheaves at the desired place and in the desired manner upon the sheaf delivery member.

A further object is to provide a retarding mechanism to co-operate with the discharging mechanism in a manner to prevent the discharge of sheaves until the sheaf delivery member is in normal sheaf receiving position.

A further object of the invention is to increase the capacity of the shocker by providing means for delivering a plurality of sheaves to the shock receptacle and, at the same time, provide means for storing a sheaf discharged from the harvester during the time the sheaf delivery member is delivering sheaves to the shock receptacle.

A further object is to provide a device that will compress a plurality of sheaves on a laterally deflectable sheaf delivery member and deliver them to and retain them under compression in the cradle until a complete shock is built, so that when the shock is discharged, it will expand at the butts so that a relatively large base is provided, whereby the shock may be set up firmly and will maintain its upright position. I attain these objects by providing an improved means co-operating with the sheaf discharging mechanism of the harvester and a sheaf delivery mechanism of the shocker.

In order to fully and clearly disclose my invention I have illustrated one embodiment thereof in the accompanying drawings. It is to be understood, however, that the construction may be modified without departing from the spirit of my invention.

Fig. 1 is a top plan view of the shocker.

Fig. 2 is a side elevational view of the shocker showing a section of the harvester deck taken on the line 2—2 in Fig. 1.

Fig. 3 is an enlarged top plan view of the supplemental discharging mechanism showing the position of the sheaf-delivering member with reference thereto.

Fig. 4 is a side elevational view of the structure shown in Fig. 3.

Fig. 5 is a front elevational view of the structure shown in Fig. 3.

Fig. 6 is a detail sectional view showing the mechanism for controlling the supplemental discharge arms taken along line 6—6 of Fig. 4.

Fig. 7 is a detail view of the pawl for controlling the supplemental discharge arms.

Fig. 8 is a detail view of an additional pawl for controlling the supplemental discharge arms.

Fig. 9 is a top plan view of a portion of the sheaf delivery member, and Fig. 10 is a detail side elevational view of the mechanism for laterally deflecting the sheaf delivery member taken along line 10—10 of Fig. 9.

The shocker shown is of the general type described and claimed in my U. S. Letters Patent #1,231,195, June 26, 1917, and #1,293,922, February 11, 1919, a rearwardly swinging sheaf delivery member or fork 12 being used, which is carried on a shocker frame 13 and movable by means of a resilient pitman connection 14 about an axis on a shaft 15 from its sheaf receiving position as shown in Fig. 1 wherein it rests on a support 16 at a point beneath the deck of the binder to its sheaf delivering position, wherein it delivers the sheaves in prostrate position in an upwardly and rearwardly movable shock receptacle 17 carried at the rear of the shocker frame.

Also, after the manner of construction described in my United States Letters Patent #1,231,195, June 26, 1917, and #1,242,112, October 2, 1917, when enough sheaves have been delivered to the shock receptacle 17 to build a shock therein of a predetermined size, a compressor 18 and needle 19 are thrown into operation to compress and bind the shock and at the completion of the compressing and binding operation, through the rotation of a knotter shaft 20, the shock receptacle is moved upward and rearward to deposit the shock in an upright position upon the ground.

The fork 12 and all the other mechanisms upon the present shocker are driven from a longitudinally disposed power shaft 21 which is of extensible and flexible character and is connected between a chain and sprocket 22 on the binder and a bevel driving gear 23 on the shocker through a co-operating bevel pinion 24. As shown, the rear end of the shaft 21 is journaled on a bracket 25 on the shocker frame, which preferably acts as a journal for a short transversely disposed power shaft 26. This shaft 26 is in turn connected in a well known manner to the resilient pitman connection 14, by which the sheaf delivery member 12 is operated. The construction of the connection of this pitman to the fork is substantially the same as that set forth in my Patent No. 1,293,922, heretofore mentioned, the fork herein, however, being swung back and forth about the shaft 15 by the pitman 14.

As the fork is moved back and forth by its power connections, it is also deflected laterally by means of a curved bail or guide 27 which is connected to the fork through a plurality of rollers 28 disposed on opposite sides of the bail and moved with the fork. The bail 27 is deflected alternately to one side or the other of the receptacle by means of a crank 29 and oscillatable shaft 30, which in turn is connected through link 31, with the two-to-one gearing 32, 33 journaled on the frame at a point beneath the shaft 15. The larger gear 32 is carried by a suitable extension 25' of the bracket 25 hereinabove referred to and is driven by the gear 33 on the shaft 26.

As the sheaf delivery member 12 moves to sheaf-delivering position it is also to be noted that it is controlled by springs after the manner described and claimed in Patent No. 1,293,922, one of the springs herein which cushions its movements and gives it a backward impulse, assuming the form of a coiled spring 34 encircling the end of the bail 27 and held in position thereon by a washer and cotter pin 35. Obviously the rollers 28 on the delivery member 12 will engage the washer 35 and act to compress this spring each time that the fork swings back to deliver a sheaf. In order to prevent the bending of the crank 29 by the constant hammering of the rollers 28 against the washer 35 and spring 34 by the sheaf delivery member 12 as it delivers sheaves in the receptacle 17, I have preferably also provided a plurality of superimposed plates 36 both of which are connected between the longitudinally disposed supplemental frame members which act to carry shaft 15, (see also my patent above mentioned) one of these plates 36 preferably being slotted at 37 in such a manner as to permit the bail 27 to move in an arc when deflected by the two-to-one gearing mechanism.

Co-operating with the sheaf delivery member 12 and controlling the compressing, binding and discharging mechanism, is a single control mechanism of the specific type described and claimed in my U. S. Letters Patent #1,231,195, June 26, 1917, comprising a cam 38 of arcuate section disposed above the shaft 15 and normally having its upper surface successively engaged by a member 39 movable with the fork which, when the sheaves in the receptacle 17 have reached a certain height, moves back over the upper surface of the cam 38 into engagement with a normally inoperative trip 40. This trip 40 is then operated and through a rod 41 and a spring connection 42, actuates a clutch controlling member 43. In this construction the clutch controlling member 43 is in the form of a crank, being provided with an upstanding arm at its stubbleward end and journaled in brackets 44 upon the frame. As shown, this member 43 extends directly grainward to a point substantially above the bevel gear 23 where it is provided with a short rearwardly extending portion 45 and a second grainwardly extending portion 46 which overlies a cam 47 on the knotter shaft.

As described in my first mentioned patent, and in a manner common to all shockers of this type, a clutch 48 is provided on the shaft 26 which controls the movement of the fork 12. This clutch is provided with a rotatable dog 49 and controls the gears 32 and 33. A second clutch 50, having a rotatable member or dog 51 is also provided which controls the connection of the compressing, binding and discharging mechanism of the shocker. This clutch 50 is located slightly rearwardly of the beveled gear 23 and upon continued movement of the shaft 21 carrying that gear, accomplishes the above ends by controlling the connection of the knotter shaft 20 to the power, which is continuously obtainable from the shaft 21 while the binder is in motion.

In the manner described and claimed in my U. S. Letters Patent #1,293,922, February 11, 1919, I have provided a clutch controlling mechanism which acts to control both of the above mentioned clutch mechanisms through successive engagements and disengagements of the rotary dogs 49 and 51. When the member 52 is rocked about its pivot 53 on the vertical supporting member 54 by the trip 55 in a manner hereinafter set forth, a vertically disposed pivoted member 56 is rocked which in turn withdraws a clutch controlling member 57 from the path of the rotatable clutch member or dog 49 in such a manner as to allow the clutch 48 to connect the fork to the power shaft 26. The member 57 controlling the clutch, is slidably mounted in a bearing 58, preferably formed in the bracket 25, and a co-operating clutch controlling member 59 is disposed at an angle of about 45° to said first mentioned controlling member and preferably connected to it by a spring 60. As shown, these two members 57 and 59 are of flat strap or bar construction and are reciprocably mounted in their supports, the member 59 preferably moving through a slotted bearing similar to the slotted bearing for the member 57, and also being provided with a similar slotted bearing in a support 61 also formed integrally with the bracket 25 and adjacent the path of the dog member 51, so that this member, when reciprocated, may successively engage the rotating dogs 51 and 49. Pivotally mounted on an extension of the bracket 25 and beneath the clutch controlling member 59 is a crank member 62, having its free arm 63 protruding into an opening in the clutch controlling member 59, and its other arm connected to a vertically disposed rod 64, which in turn is connected to the crank member 45 at a point adjacent the laterally extending portion 46.

Cooperating with the above described controlling mechanism and driven from any suitable intermittent movable part of the power mechanism; as, for instance, the knotter shaft 20, is the dumping or shock discharging mechanism. This mechanism as described and claimed in my U. S. Letters Patent #1,293,922, February 11, 1919, comprises a connection to the knotter shaft through a short crank 65 mounted on the shaft 66, an upwardly extending link 67 pivoted to the crank 65, and a second crank 68 flexibly connected to the upper end of the link 67 and itself rotatably mounted on the rear end of the knotter shaft 20 and engageable with a collar 69 to rotate it during a portion of the revolution of the knotter shaft 20 in such a manner as to raise the lower link 67. For a more detailed description of this mechanism see my above mentioned patent.

My improved tripping and discharging mechanism for positioning the discharged sheaves properly upon the sheaf delivery member and tripping same at the proper time comprises a longitudinally extending tongue member 70 fixed to the forward end of the main frame 13 of the shocker and adjustably supported by a pipe 71 which is fixed to the frame of the harvester to which the shocker is attached. The tongue 70 is held from lateral movement by a bracket 73 fixed to the pipe 71 and a pin 74 extending through said bracket and pipe. See Fig. 5. The forward end of the tongue is provided with a vertically disposed portion 75 to which is connected an L-shaped frame member 76 and a rearwardly extending member 77. These members are connected at their rear ends to the frame of the shocker at 76′ and 77′. The members 76 and 77 are positioned on the opposite sides of the sheaf delivery member 12 and are provided with a series of laterally extending fingers 78 which form a support for the sheaves in the path of movement of the sheaf delivery member. The fingers 78 fixed to the frame member 76 are provided with a vertically extended portion 79 against which the sheaves are compressed by the action of the discharging mechanism, hereinafter more fully set forth. The frame member 76 is supported by a diagonally disposed brace 80 fixed to the vertically extended portion 75 of the tongue 70.

Referring to Fig. 5, the relative positions of the supplemental discharging mechanism and the sheaf delivery member to the harvester are here shown. The deck 81 of the harvester has positioned thereabove the regular discharge arms 82 and breast plate 83. Attached to the breast plate 83 by means of bolts 83′ is a resilient stripper frame 84 for the purpose of retaining the first sheaf 85 discharged from the binding mechanism of the harvester. Securely attached to deck 81 by means of bolts 86 is a curved deck extension 87 which flexibly rests upon a second deck extension 88. It will be noted that the outer edge of the deck extension 88 extends diagonally with respect to the sheaf delivery member 12 in a manner in which the rear portion of said deck extends closer to the sheaf delivery member than the forward end for the purposes hereinafter more fully set forth. The deck extension 88 is provided with a series of slotted openings 88′ and is secured at its stubbleward side to the rearwardly extending frame member 77 and at its grainward side to the front brace 89 and a rear brace 90. The lower end of both of said braces are secured to the tongue 70 by means of the bolts 91 and 92 respectively.

The supplemental discharging mechanism comprises a shaft 93 having an offset portion or crank 94 formed at its forward end. The rear end of the shaft 93 is journaled in a bearing 95 which is carried by bearing support member 96 fixed to vertical supporting members 54 and brace 90. Fixed to rear end of the shaft is a driven disk 97 which pivotally carries the spring pressed pawl 98. The disk 97 is further provided with a forwardly projecting finger 99 which is adapted to engage the trip 55 which sets into operation the sheaf delivery member as above described. The offset portion 94 of the shaft 93 is provided with a crank bracket 100 fixed thereto by means of a pin 101. The forward end of the bracket 100 is journaled in the diagonally disposed supporting member 102 which is secured at 103 to the vertically disposed portion 75 of the tongue 70 and at 104 to the brace 89. See Fig. 5. A pair of discharge arms 105 are journaled on the shaft 94 and comprise two vertically disposed forward arms 106 and rearward arms 106′. The rearward arms 106′ extend stubblewardly in advance of the forward arms 106 as shown in Fig. 5 for the purpose of compensating for the differences in the size of the heads and butts of the sheaves and to insure the proper discharge of the sheaves upon the sheaf delivery member. In other words, the heads of the sheaves being smaller in size than the butts, require to be positively discharged stubblewardly farther in order that they may be positioned in parallel relation with respect to the sheaf delivery member. Projecting from the barrel portions 107 of the discharge arms 105 are a pair of downwardly extending cranks 108 having bearing portions 109 formed at the lower ends thereof which are adapted to receive the free ends 110 of the links 111. The other ends of the links 111 are pivotally connected at 112 to the diagonally disposed members 102 and 96.

The actuation of these supplemental discharge arms is controlled by a longitudinally disposed rod 113 having its forward end bent in the form of a crank 114 and disposed in the path of the sheaves discharged from the harvester. The crank 114 is limited in its movement by a stop 115 fixed to the frame member 77. The forward end of the rod 113 is journaled in the bracket 116 fixed to the member 77 and the rear end of said rod is journaled at 117 in a bracket 118 fixed to an arch-shaped deck support 119, the stubbleward end 120 of said support being secured to the frame member 77, and the grassward end 121 being fixed to the member 96. The rearward end of the rod 113 has a grassward extending crank portion 122 adapted to engage the pawl 98 and normally disposed in the path of said pawl by an extension spring 122' fixed to the crank 122 at one end and to the frame member 54 at the other. A second trip mechanism for controlling the actuation of the supplemental discharge arms to acuate the arms to move from the dotted line position to full line position shown in Fig. 5, comprises a pivotally mounted trip 123 disposed in the path of movement of sheaf delivery member 12. The trip 123 is mounted for vertical movement on a bracket 124 fixed to the frame member 77. Pivotally attached to a downwardly projecting crank portion 125 of the trip 123 is a grasswardly extending rod 126. (See Fig. 6.) Adjacent the grassward end of the rod 126 is a raised portion 127 adapted to engage a bearing member 128. This member 128 is normally pressed stubblewardly against the portion 127 of the rod 126 by a compression spring 129. A washer and nut 130 threaded on the end of the rod 126 holds the spring 129 in place. From this construction it will be noted the rod 126 may move stubblewardly relative to the bearing 128 and thus permit the sheaf delivery member in its upward movement of delivering the sheaves to engage the trip 123 without affecting the stop 132, presently to be described. The bearing member 128 is pivotally mounted on the stud 131 formed integrally on a stop 132 pivoted to the bracket 133 fixed to the diagonally disposed member 96 by means of bolts 134. The stop 132 which is pivoted at 135 extends thru a slotted opening 136 in the bracket 137 fixed to the member 96. The stubbleward end of slot 136 limits the movement of the stop 132 which is normally held in the path of the pawl 98 by means of an extension spring 138 connected at one end to the stop 132 by means of a link 139 and at the other to an extension 140 of the bracket 118.

The power for driving the supplemental discharging mechanism is derived from a constantly driven clutch member 141 intermittently engaged with the spring pressed pawl 98 of usual construction. The clutch member 141 is fixed to a universal connection 142 and a short drive shaft 143 which is supported in a bearing 144 carried by a support 145 fixed to the bracket 25. The shaft 143 is geared to the power shaft 21 by means of usual sprockets 146, 147 and chain 148.

In addition to the function performed by the supplemental discharge arms 106 and 106' of discharging the sheaves out into the path of the sheaf delivery member 12 they also perform a function of preventing the initial sheaf from being discharged into the path of the sheaf delivery member by obstructing the passage of the sheaf as shown in the dotted lines 106 and 106' in Fig. 5 until the sheaf delivery member 12 assumes its normal sheaf receiving position. It will also be noted that in the event a band on the initial sheaf discharged by the discharge arms 82 should break, the untied grain will not scatter on the stubblewardly extending fingers 78 and prevent the return of the sheaf delivery member 12 to its normal position as hertofore experienced, but will be confined on the grassward side of the discharge arms 106 and 106' shown in the dotted lines in Fig. 5 until the sheaf delivery member returns to its normal position, at which time the supplemental discharge arms assume their normal position, as shown in the full lines in this figure.

In the operation of the shocker shown herein, the harvester binding and discharging mechanism operates in the usual manner discharging the first sheaf 85 out on the extension deck 88 as shown in Fig. 5. This initial sheaf is held from displacement by the resilient stripper frame 84. When the next sheaf is bound, it is likewise forced thru the same path and is forced against the first sheaf and thereby actuates the trip 114 against the tension of the spring 122' in the manner shown in Fig. 7. This releases the spring pressed pawl 98 to engage the constantly driven clutch member 141 and thereby actuates the supplemental discharge arms 105 to move from the full line position thru slotted openings 88' in the deck 88 to the dotted line position shown in Fig. 5, discharging the two sheaves to the dotted line position shown in this figure on to the supporting fingers 78 and compressing them between the vertical member 79 and the discharge arms 106 and 106' in the path of the sheaf delivery member. It will be noted that the driving member 97 and pawl 98 make substantially a half revolution and that the pawl 98 is interrupted by the stop 132, disengaging the constantly driven clutch member 141 from the shaft 93 and thereby locking the discharge arms 106 and 106' in the position of compressing the two discharged sheaves. When the two discharged sheaves are in the position shown in the dotted lines in Fig. 5 and during the initial half revolution of the driving member 97, the extension 99 which is formed integrally therewith engages the trip 55 and rocks the shaft 52, swinging the vertically disposed member 56 about its pivot and releasing stop 57 from the pawl 49 and thereby connecting the power shaft 26 thru the pitman 14 to oscillate the sheaf delivery member 12 to deliver the sheaves in the cradle 17. As hereinbefore stated the upward movement of the sheaf delivery member 12 engages the trip 123 and raises said trip upwardly about its pivot. The yielding of this trip is permitted by reason of the rod 126 and spring 129. On the return of the sheaf delivery member 12 to its normal sheaf receiving position, the trip 123 is depressed downwardly and thru the crank 125, the rod 126 together with raised portion 127, is moved grasswardly. As the rod 126 is moved grasswardly the bearing member 128 which is engaged by the raised portion 127 is also moved, thereby swinging the stop 132 out of engagement with the pawl 98 and connecting the shaft 93 with the constantly driven clutch member 141 to return the supplemental arms 106 to their normal position shown in Figures 3 and 5.

From the above description, it will be understood that the supplemental discharge arms 106 and 106' remain in the position shown in Fig. 4, (which is the same as that shown in the dotted lines in Fig. 5), during the time the sheaf delivery member 12 is delivering the two discharged sheaves into the receptacle 17. While these discharge arms 106 and 106' are in this position, they act as retarders in that they obstruct the path of any sheaves or loose grain to prevent them from being discharged into the path of the sheaf delivery member 12 until the sheaf delivery member has assumed its normal sheaf receiving position. A further important result accomplished by my improved device is that means is provided for normally storing a sheaf discharged by the discharge arms 82 on the deck 88 during the time the sheaf delivery member 12 is delivering sheaves to the receptacle. In other words, the capacity of the sheaf delivery member has been doubled over the type of shocker heretofore constructed, not only because of the fact that the sheaf delivery member delivers two sheaves at a time, but because the binding mechanism 83 of the harvester is permitted to bind and discharge sheaves uninterruptedly. That is, the sheaf delivery member 12 is so timed with relation to the binding mechanism of the harvester that the sheaf delivery member will deliver the two sheaves into the receptacle and return to its normal sheaf receiving position before two other sheaves are bound and discharged from the binding mechanism of the harvester. By reason of this construction, it has been found to be unnecessary to lock or control the binding and discharging mechanism of the harvester by the sheaf delivery mechanism which heretofore occasionally caused the binding mechanism to choke when the harvester was cutting heavy grain.

It will be noted in my improved construction that the sheaves are discharged and compressed by the supplemental discharging mechanism and retained in a compressed condition by this mechanism in the path of the sheaf delivery member. The tines on the sheaf delivery member penetrate these sheaves in this compressed state and deliver them to the cradle 17 in the same condition. It will also be noted that as the sheaf delivery member oscillates back and forth the bail 27 deflects the said delivery member so that the sheaves are alternately deflected on one side of the cradle 17 and then on the other. This operation will continue until the shock is built up with the sheaves converging and overlapping at the heads and diverging at the butts.

While I have in this application described one embodiment which my invention may assume in practice, it is, of course to be understood that the form herein shown is for the purposes of illustration and may be modified without departing from the spirit of my invention.

What I claim as my invention and desire to secure by Letters Patent, is:

1. In combination, a binder, including a sheaf discharging member, a retarding mechanism cooperating with said discharge member, an upwardly and rearwardly swinging sheaf delivery member for carrying away sheaves discharged by said member, and means for controlling the actuation of said retarding mechanism by said sheaf delivery member.

2. In combination, a binder, including a sheaf discharging member, a retarding mechanism cooperating with said discharge member, an upwardly and rearwardly swinging sheaf delivery member for carrying away sheaves discharged by said member, and means movable in the path of the discharging sheaves for retarding said sheaves controlled by said sheaf delivery member.

3. In combination, a binder, including a sheaf discharging member, a retarding mechanism cooperating with said discharge member, an upwardly and rearwardly swinging sheaf delivery member for carrying away sheaves discharged by said member, and means disposed in the path of said sheaf delivery member for controlling the operation of said retarding mechanism.

4. In combination, a harvester, a sheaf discharging mechanism, a deck carried by said harvester over which the sheaves are discharged, a supplemental deck connected with the first named deck, and power actuated means pivoted below said supplemental deck for retarding the discharging of said sheaves.

5. In combination, a harvester, a sheaf discharging mechanism, a deck carried by said harvester over which the sheaves are discharged, a supplemental deck connected with the first named deck, and power actuated means normally positioned below said supplemental deck and movable into the path of the discharging sheaves for retarding the discharging of said sheaves.

6. In combination, a binder, including a sheaf discharging member, a supplemental discharging member cooperating with said first member, and means located in the path of movement of the sheaf for controlling the actuation of said supplemental discharging member.

7. In combination, a binder, including a sheaf discharging member, a supplemental discharging member cooperating with said first member, and means engageable by a discharged sheaf for controlling the actuation of said supplemental discharging member.

8. In combination, a binder including a sheaf discharging member, a supplemental discharging member cooperating with said first named member, an upwardly and rearwardly swinging sheaf delivery member for carrying away sheaves discharged by said members, means located in the path of movement of the sheaves for controlling the actuation of the supplemental member to discharge said sheaves, and means for controlling the actuation of said supplemental member to return same to normal position.

9. In combination, a binder including a sheaf discharging member, a supplemental discharging member cooperating with said first named member, an upwardly and rearwardly swinging sheaf delivery member for carrying away sheaves discharged by said members, means located in the path of movement of the sheaves for controlling the actuation of the supplemental member to discharge said sheaves, and means located in the path of movement of said sheaf delivery member for controlling the actuation of said supplemental member to return same to normal position.

10. In combination, a sheaf discharging mechanism, a supplemental discharge mechanism, a sheaf delivery mechanism, including an oscillating sheaf delivery member, means for supporting in the path of said member the load therefor discharged by said discharge mechanism, and means for holding said load under compression by said supplemental discharge mechanism.

11. In combination, a sheaf discharging mechanism, a sheaf delivery mechanism including an oscillating sheaf delivery member, means for supporting in the path of said member the load therefor discharged by said discharge mechanism, and means for holding said load under compression by said discharge mechanism.

12. In combination, a binder deck, sheaf discharging and compressing mechanism adjacent the same, means for supporting and compressing a sheaf discharged by said mechanism in parallel relation to the edge of said deck, and sheaf delivery means including a swinging sheaf delivery member movable in a fore and aft direction and into engagement with said sheaf when so supported and compressed by said discharging mechanism.

13. In combination, a binder deck, sheaf discharging and compressing mechanism adjacent the same, means for supporting and compressing a plurality of sheaves discharged by said mechanism in parallel relation to the edge of said deck, and sheaf delivery means including a swinging sheaf delivery member movable in a fore and aft direction and into engagement with said sheaf so supported and compressed by said discharging mechanism.

14. In combination, a harvester, a shocking mechanism, an upwardly movable sheaf delivery member on said shocking machine disposed in a plane below the deck of said harvester, and means for positioning and compressing a plurality of sheaves and holding said sheaves compressed in the path of said sheaf delivery member.

15. In combination, a harvester, a discharging mechanism carried thereby, a supplemental discharging mechanism cooperating with said first mentioned mechanism, a shocking machine, an upwardly movable sheaf delivery member on said shocking machine, means for controlling the actuation of said supplemental discharging mechanism, and additional means for controlling the actuation of said last named mechanism to return same to normal position.

16. In combination, a harvester, a discharging mechanism carried thereby, a supplemental discharging mechanism cooperating with said first mentioned mechanism, means for controlling the actuation of said supplemental discharging mechanism, and additional means for controlling the actuation of said last named mechanism to return same to normal position.

17. In combination, a harvester, a discharging mechanism carried thereby, a supplemental discharging mechanism cooperating with said first mentioned mechanism, a shocking machine, an upwardly movable sheaf delivery member on said shocking machine, means for controlling the actuation of said supplemental discharging mechanism to discharge the sheaves, and additional means for controlling the actuation of said last named mechanism.

18. In combination, a harvester, a discharging mechanism carried thereby, a supplemental discharging mechanism cooperating therewith, means for controlling the actuation of said supplemental discharging mechanism by the sheaves discharged from said first named mechanism, and supplemental means for controlling the actuation of said supplemental discharging mechanism.

19. In combination, a harvester, a discharging mechanism carried thereby, a shocking machine, an upwardly movable sheaf delivery member on said shocking machine, and means for controlling the actuation of said discharging mechanism by the sheaves discharged from said harvester and by said sheaf delivery member.

20. In combination, a harvester, a discharging mechanism carried thereby, a supplemental discharging mechanism cooperating with said first mentioned mechanism, a shocking machine, an upwardly movable sheaf delivery member on said shocking machine, and means for controlling the actuation of said supplemental discharging mechanism by the sheaves discharged from said first mentioned discharging mechanism and by said sheaf delivery member.

21. In combination, a harvester, a discharging mechanism carried thereby, a shocker, a sheaf delivery member pivoted thereon, means including said discharging mechanism for discharging and compressing a plurality of sheaves in the path of movement of said delivery member, and means for laterally deflecting said sheaf delivery member during its movement to sheaf delivering position.

22. In combination, a harvester, a discharging mechanism carried thereby, a shocker, a sheaf delivery member pivoted thereon, and means including said discharging mechanism for discharging and compressing a plurality of sheaves and retaining said sheaves compressed in the path of movement of said delivery member during its movement to sheaf delivering position.

23. In combination, a harvester, a discharging mechanism carried thereby, a supplemental discharging mechanism cooperating with the first mentioned mechanism, a shocker, a sheaf delivery member pivoted thereon, means including said supplemental discharging mechanism for discharging and compressing a plurality of sheaves in the path of movement of said delivery member, and means for laterally deflecting said sheaf delivery member during its movement to sheaf delivering position.

24. In combination, a harvester, a discharging mechanism carried thereby, a shocker, a sheaf delivery member pivoted thereon, a sheaf receiving cradle pivotally mounted on said shocker, means for discharging and compressing the sheaves on said delivery member, and means for alternately deflecting said delivery member to opposite sides of the said cradle.

25. In combination, a harvester, a discharging mechanism carried thereby, a supplemental discharging mechanism, a shocker, a sheaf delivery member pivoted thereon, a sheaf receiving cradle pivotally mounted on said shocker, means including said supplemental discharging mechanism for discharging and compressing the sheaves on said delivery member, and means for alternately deflecting said delivery member to the opposite sides of the cradle.

26. In combination, a harvester, a discharging mechanism carried thereby, a shocker, a sheaf delivery member pivoted thereto, means for controlling the actuation of said delivery member by said discharging mechanism, and means for controlling the actuation of said discharging mechanism by said delivery member.

27. In combination, a harvester, a discharging mechanism carried thereby, a shocker, a sheaf delivery member pivoted thereto, means for controlling the actuation of said delivery member by said discharging mechanism, and means including a trip located in the path of movement of said delivery member for controlling the actuation of said discharging mechanism by said delivery member.

28. In combination, a harvester, a discharging mechanism carried thereby, a shocker, a sheaf delivery member pivoted thereto, means for controlling the actuation of said delivery member by said discharging mechanism, and means for controlling the actuation of said discharging mechanism by said delivery member to return said mechanism to its normal position.

29. In combination, a harvester, a discharging mechanism carried thereby, a shocker, a sheaf delivery member pivoted thereto, means for controlling the actuation of said delivery member by said discharging mechanism, and means for controlling the actuation of said discharging mechanism by said delivery member when said member is returning to its normal position.

30. In combination, a binder including a sheaf discharging member, and a supplemental discharging member comprising a plurality of discharge arms certain of said discharge arms discharging stubblewardly in advance of other discharge arms.

31. In combination, a binder, including a sheaf discharging member, a supplemental discharging member comprising sets of forwardly and rearwardly disposed discharge arms, and means for driving said rearwardly disposed arms stubblewardly in advance of said forwardly disposed arms.

32. In combination, a binder, including a sheaf discharging member, a supplemental discharging member comprising a plurality of discharge arms, and means including said discharge arms for effecting a varying compression of the sheaves discharged from said discharging member.

33. In combination, a harvester, a discharging mechanism carried thereby, a shocker connected to said harvester, a sheaf delivery member pivoted on said shocker, and means including said discharging mechanism for discharging and compressing a plurality of sheaves in the path of said delivery member.

34. In a harvester, a sheaf discharging mechanism, a supplemental discharging mechanism, means for storing a sheaf discharged by said first named discharging mechanism, and means for actuating said supplemental discharging mechanism when a second sheaf is discharged by said first named discharging mechanism.

35. In a harvester, a sheaf discharging mechanism, a supplemental discharging mechanism, means for storing a sheaf discharged by said first named discharging mechanism, and means actuated by said stored sheaf upon a discharge of a second sheaf from said first discharging mechanism for controlling the actuation of said supplemental discharge mechanism.

36. In a harvester, a sheaf discharging mechanism, a supplemental discharging mechanism, and means for discharging two sheaves from said first discharging mechanism for controlling the actuation of said supplemental discharging mechanism.

37. In combination, a harvester having a deck, a shocking machine connected to said harvester, a sheaf delivery member mounted on said harvesting machine for delivering sheaves into said shocking machine, and means for storing a sheaf on said deck during the time said sheaf delivery member is delivering sheaves in said shocking machine.

38. In combination, a harvester having a deck, a supplemental deck connected with said first mentioned deck, a shocking machine connected to said harvester, a sheaf delivery member carried on said shocking machine for delivering sheaves into said shocking machine, and means for storing a sheaf on said supplemental deck during the time said sheaf delivery member is delivering sheaves in said shocking machine.

39. In a harvester, a sheaf discharging mechanism, a supplemental sheaf discharging mechanism cooperating with said last named mechanism, and means controlled by the sheaves discharged from said first named discharging mechanism for actuating said supplemental discharge mechanism.

40. In a harvester, a deck, sheaf discharging mechanism, a deck extension, a sheaf delivery member normally disposed adjacent said extension, a shock forming receptacle, means for swinging said delivery member from the extension to the receptacle, and means movable through the deck extension for temporarily holding a sheaf discharged by said sheaf discharging mechanism while the delivery member is swinging from the receptacle back to its normal position adjacent the deck extension.

In testimony whereof I affix my signature.

CLEMMA R. RANEY.